US008869417B2

(12) United States Patent
Yeh

(10) Patent No.: US 8,869,417 B2
(45) Date of Patent: Oct. 28, 2014

(54) INTEGRATED LINE AND CURVE DRAWING TEMPLATES FOR CLOTH STITCHING

(71) Applicant: Fang Chi Yeh, Taipei (TW)

(72) Inventor: Fang Chi Yeh, Taipei (TW)

( * ) Notice: Subject to any disclaimer, the term of this patent is extended or adjusted under 35 U.S.C. 154(b) by 244 days.

(21) Appl. No.: 13/623,857

(22) Filed: Sep. 20, 2012

(65) Prior Publication Data

US 2014/0075771 A1 Mar. 20, 2014

(51) Int. Cl.
*G01B 3/14* (2006.01)

(52) U.S. Cl.
USPC .............................................. 33/566; 33/565

(58) Field of Classification Search
USPC ...... 33/566, 1 B, 1 G, 562, 563, 565; D10/64
See application file for complete search history.

(56) References Cited

U.S. PATENT DOCUMENTS 1,604,232 A * 10/1926 Lipke ............................. 33/1 A
D137,150 S * 1/1944 Riddell .......................... D10/64
D167,043 S * 6/1952 Kintz ............................ D10/64
2,604,702 A * 7/1952 Collins .......................... 33/565
2,933,818 A * 4/1960 Palmer ........................... 33/565
5,058,285 A * 10/1991 Morita et al. .................. 33/563
5,065,523 A * 11/1991 Chiang .......................... 33/562
5,577,328 A * 11/1996 Kerry, Sr. ...................... 33/563
6,321,457 B1 * 11/2001 Lariviere et al. ............... 33/562
8,397,396 B2 * 3/2013 Nethery ......................... 33/566
2003/0115767 A1 * 6/2003 Wedekind et al. .............. 33/566
2005/0252019 A1 * 11/2005 Gordon et al. ................. 33/566
2012/0137532 A1 * 6/2012 Yeh .............................. 33/562

FOREIGN PATENT DOCUMENTS

GB 2044181 A * 10/1980

* cited by examiner

*Primary Examiner* — Christopher Fulton

(57) ABSTRACT

The embodiments of the present invention provide a wide variety of integrated and compact templates of the parallel lines and multi-radius curves drawing for cloth stitching. The integrated templates provide the convenience for the drawing of those parallel curves, lines, and angles focused on the same central point. The integrated templates can be designed with a wide variety of shapes consisting of many sub-shapes with different distances from the central point or the common reference point, and be manufactured by the injection molded transparent plastic in the compact and solid one-body format without any mechanical connection.

9 Claims, 11 Drawing Sheets

Prior Art

Prior Art

Prior Art

INTEGRATED LINE AND CURVE DRAWING TEMPLATES FOR CLOTH STITCHING

FIELD OF THE INVENTION

The embodiments of the present invention relate to the templates of the line and curve drawing for the cloth stitching.

BACKGROUND OF THE INVENTION

In the prior art, as shown in FIG. 1, the conventional template comprises circular holes with different diameters. One of the problems with the prior art is that is it difficult to draw concentric circles with the same central point, since the circular holes of the conventional template lack a common central point. Other problems are that it contains few circles due to its limited surface area, and inconvenient operations.

As shown in FIGS. 2 and 3, the template comprises several circular plates, and arranged in a flat plane, which needs less material and cost for manufacturing. It is also less in weight and volume. But, every circular plates are separated from each other without firm connection amongst them, thus, said one or more of circular plates is easy to lose after using, and also not easy to be solid and staying separated without cross when drawing lines, circles and curves with common central spot, which cause inconvenience of stocking and using.

SUMMARY OF THE INVENTION

To solve above-mentioned disadvantages of prior art, the present invention provides a wide variety of integrated and compact templates of the parallel lines and multi-radius curves drawing for cloth stitching.

The integrated templates provide the convenience for the drawing of those parallel curves, lines, and angles focused on the same central point or the common reference point. The templates adapt the innovations of the integrated layout with respect to the same central point or the common reference point, in order to possess the characteristics of multi-functions, convenience, accuracy, and precision.

The integrated templates can be designed to meet many different requirements of the drawing.

DETAILED DESCRIPTION OF PREFERRED EMBODIMENT

Figure 1:
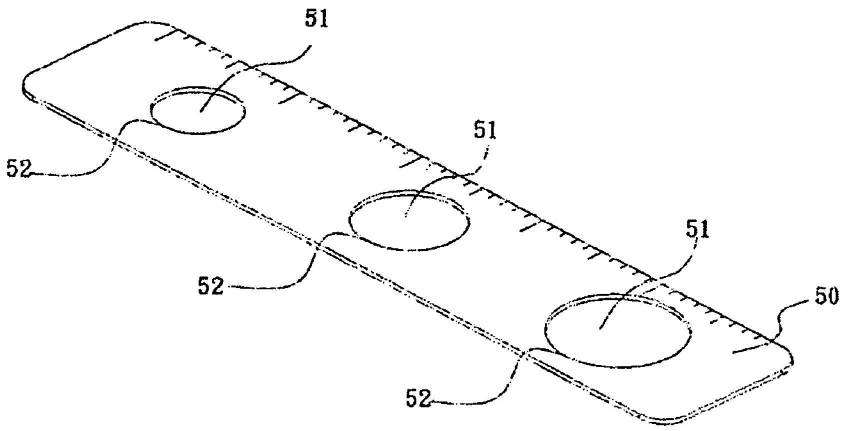
FIG. 1 is the perspective view of a traditional drawing template with three circular holes with different-diameter.
Figure 2:
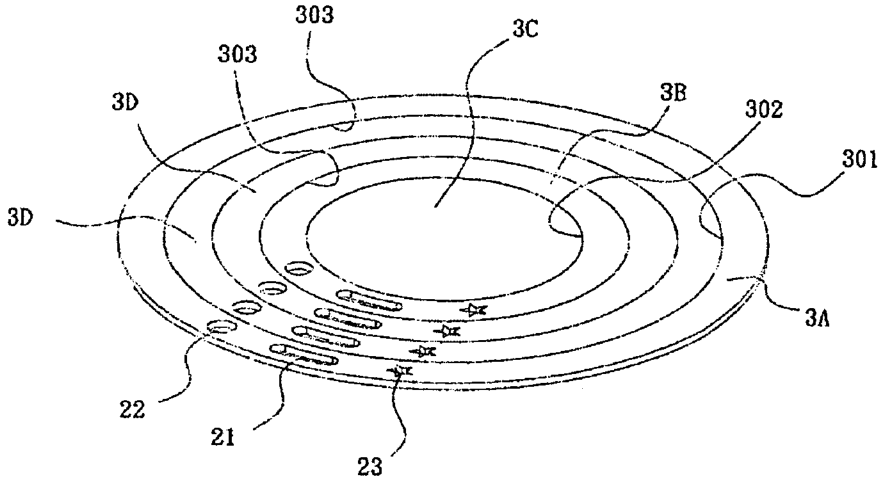
FIG. 2 is the perspective view of a revised drawing template with five circular plates arranged in a flat plane.
Figure 3:
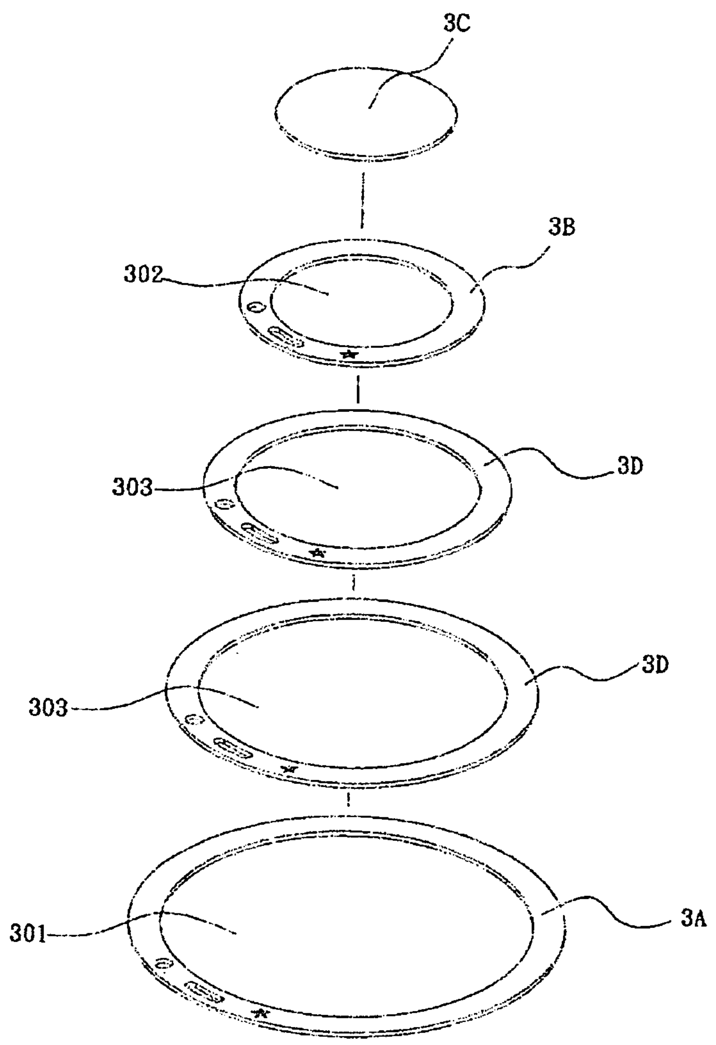
FIG. 3 is the perspective view of the five separated circular plates from the revised drawing template as shown in FIG. 2.
Figure 4:
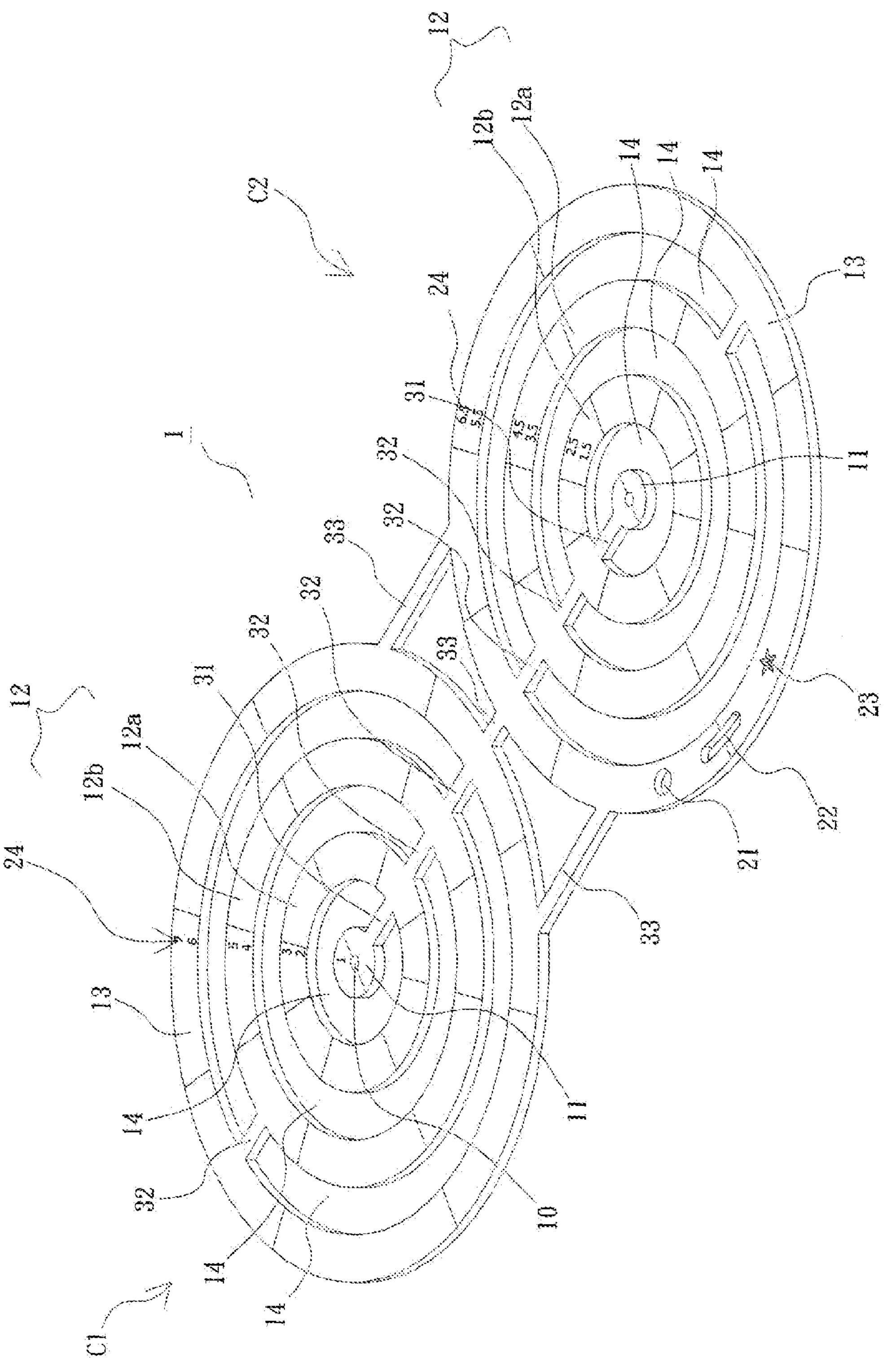
FIG. 4 is the three-dimensional view of the connected integrated template consisting of different radius of parallel circular plates with the same central point in the respective halves. The both halves have the different-radius circular innermost plates containing the central points.
Figure 5:
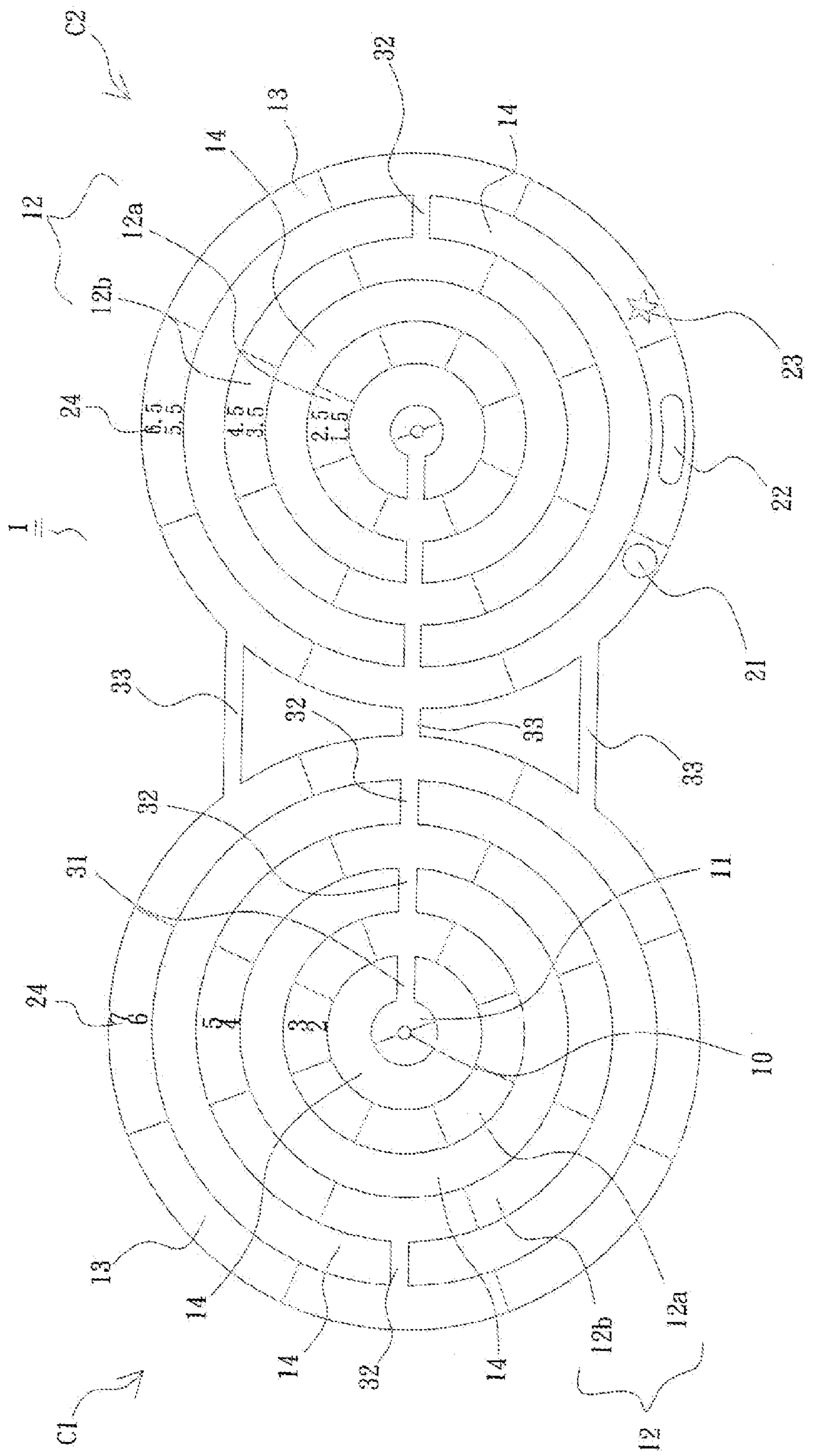
FIG. 5 is the top-view of the connected integrated template as shown in FIG. 4.

FIG. 4 depicts the three-dimensional representation of the connected integrated template consisting of different radii of parallel circular plates with the same central point in the respective halves. The both halves have the parallel circular plates with different radii from each other. The integrated templates can be designed with a wide variety of shapes consisting of many sub-shapes with different distances from the central point, and be manufactured by the injection molded transparent Polyvinyl chloride (PVC), Polypropylene (PP) or Acrylic in the compact and solid one-body format without any mechanical connection.

According to FIG. 4, the present invention includes two halves C1, C2 connected by connecting stick 33. There are two central points 10, which are respectively positioned in two halves C1, C2. Each half has its own innermost plate 11, middle plates 12*a*, 12*b*, and outermost plate 13 which are connected by connecting rod 31, 32. The innermost, middle, and outermost plates of each half have the same central point. All plates of both halves are intended to be different from each other in the inner and outer diameters, but distances between each 2 templates in the same half are equal. in order to draw the curves with as many radii as possible. Both inside and outside rims of each plate are intended to draw curves. Each plate is intended to be marked with its inner and outer radii 24. Some different-shaped holes 21, 22, 23 can be drilled on said outermost plates 13 for special remarking.

Figure 6:
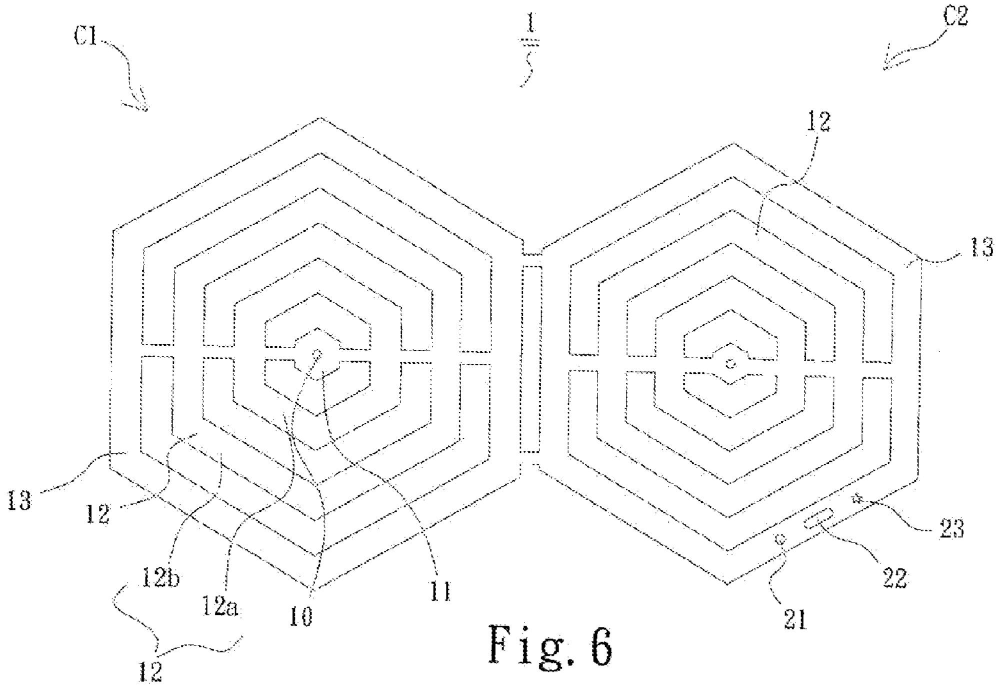
FIG. 6 is the top-view of the connected integrated template consisting of different sizes of parallel hexagonal plates with the same central point in the respective halves.
Figure 7:
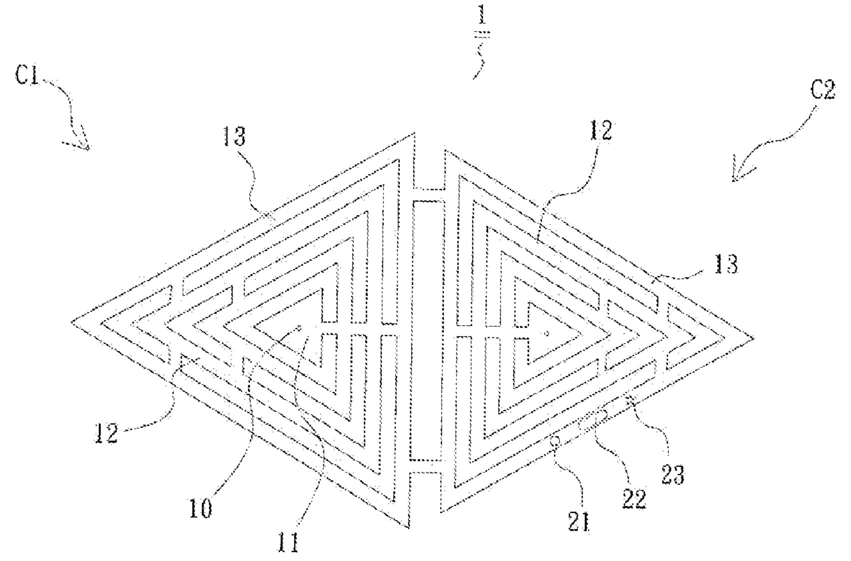
FIG. 7 is the top-view of the connected integrated template consisting of different sizes of parallel triangular plates with the same central point in the respective halves.
Figure 8:
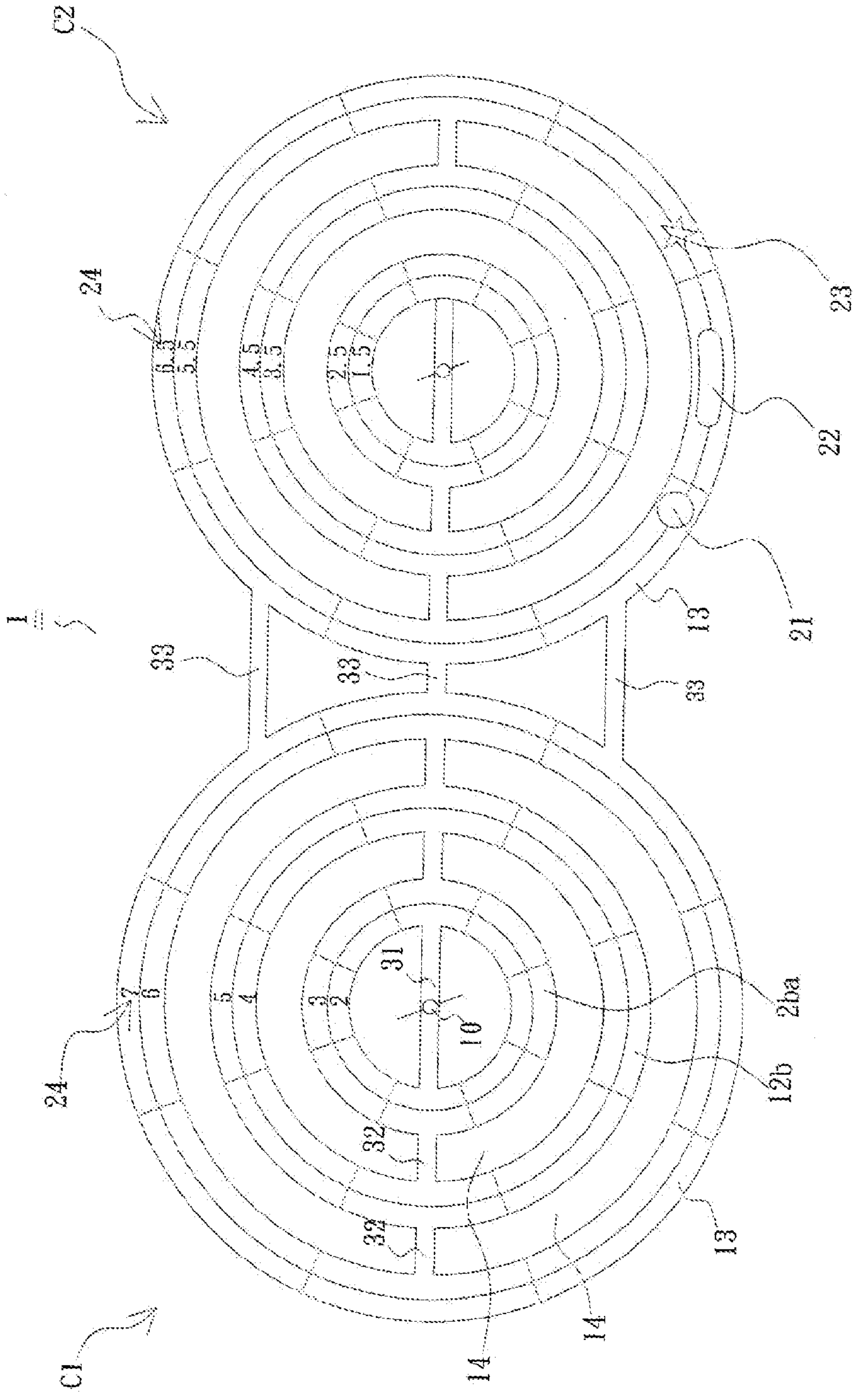
FIG. 8 is the top-view of the connected integrated template consisting of different radii of parallel circular plates with the same central point in the respective halves. The both halves have the same innermost rods containing the central points.
Figure 9:
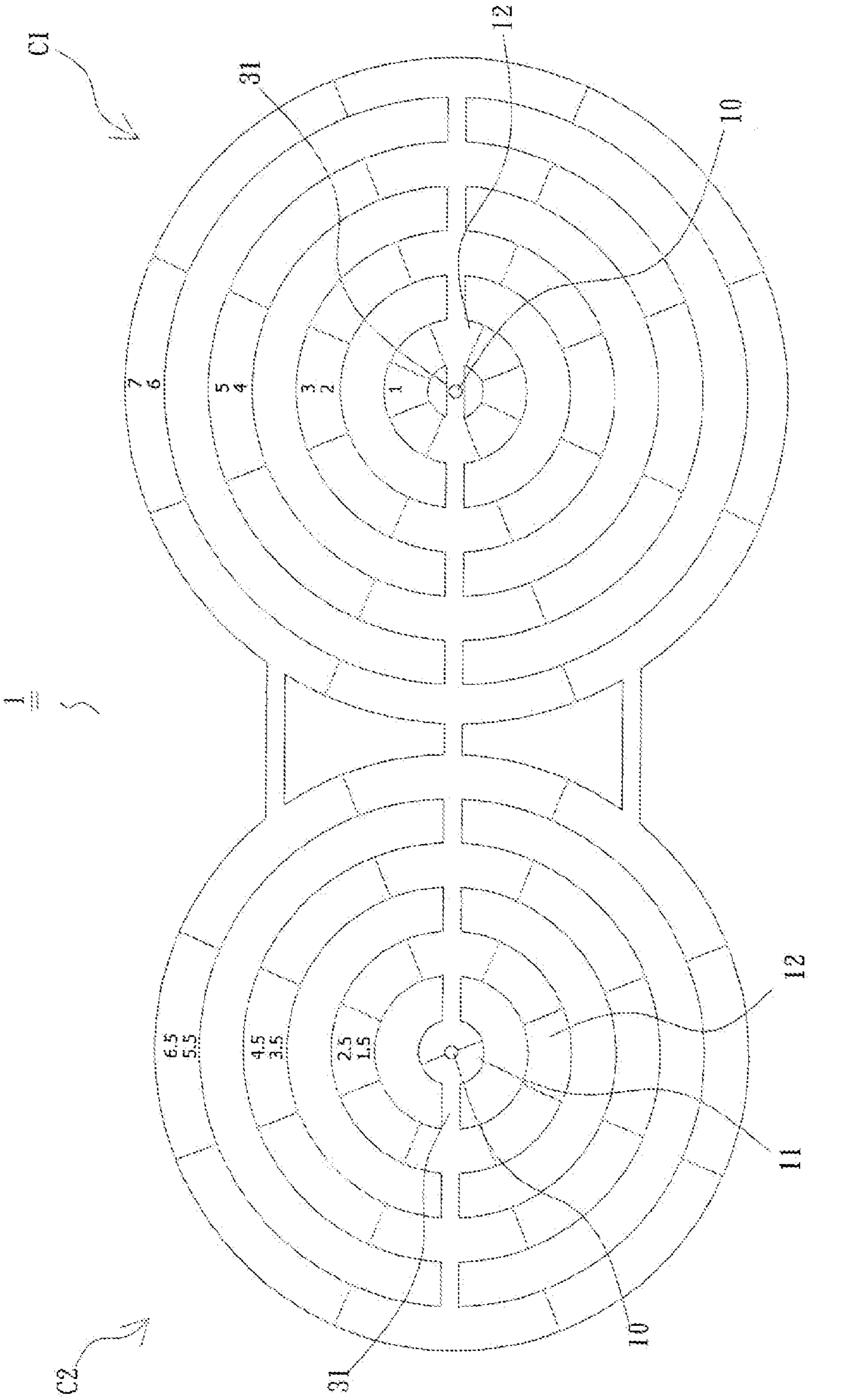
FIG. 9 is the top-view of the connected integrated template consisting of different radii of parallel circular plates with the same central point in the respective halves. The both halves have the different-shaped innermost plates containing the central points.
Figure 10:
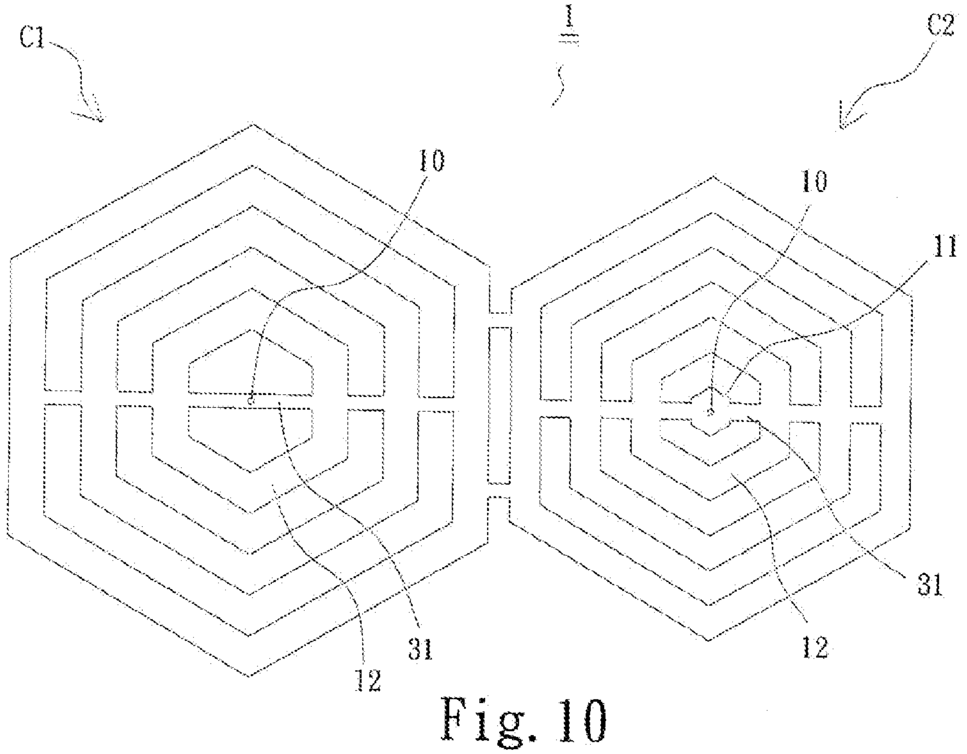
FIG. 10 is the top-view of the connected integrated template consisting of different sizes of parallel hexagonal plates with the same central point in the respective halves. The central points of the both halves are positioned in different shapes of pieces, one is in the rod, and another is in the hexagon.
Figure 11:
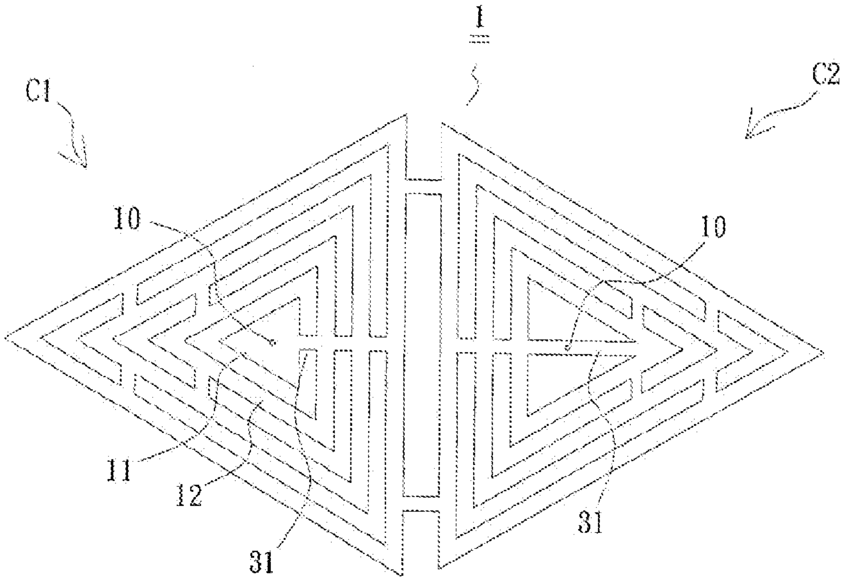
FIG. 11 is the top-view of the connected integrated template consisting of different sizes of parallel triangular plates with the same central point in the respective halves. The central points of the both halves are positioned in different shapes of pieces, one is in the rod, and another is in the triangle.
Figure 12:
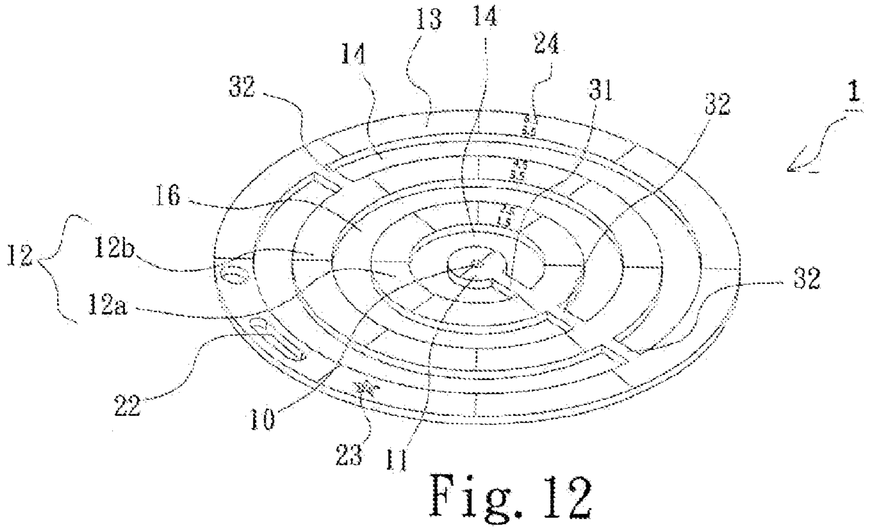
FIG. 12 is the three-dimensional view of the single integrated template consisting of different radius of parallel circular plates with the same central point.
Figure 13:
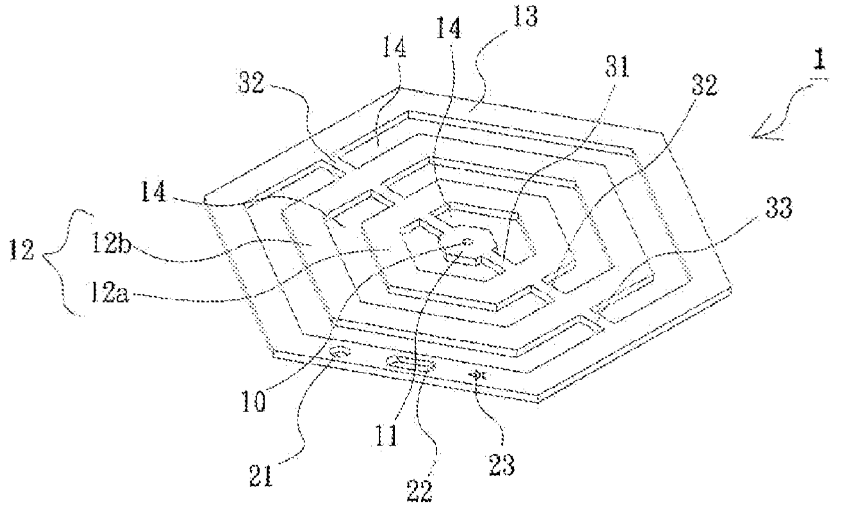
FIG. 13 is three-dimensional view of the single integrated template consisting of different sizes of parallel hexagonal plates with the same central point.
Figure 14:
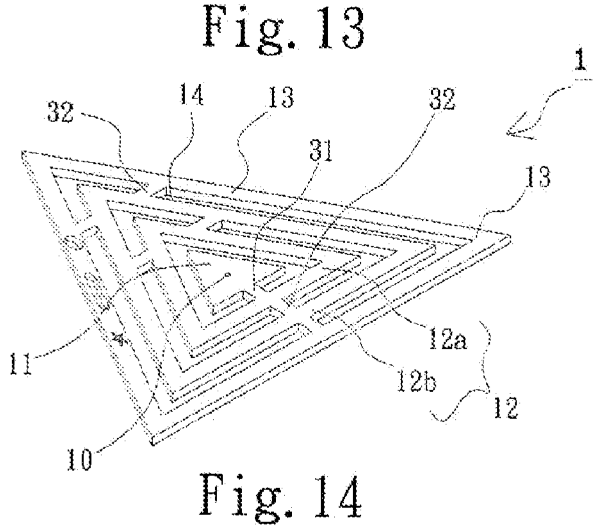
FIG. 14 is three-dimensional view of the single integrated template consisting of different sizes of parallel triangular plates with the same central point.

The embodiments of the present invention can be adapted for the many different shapes depend on the need of users, such as those shown in FIGS. 6-14. FIG. 6 is the connected integrated template consisting of different sizes of parallel hexagonal plates. FIG. 7 is the connected integrated template consisting of different sizes of parallel triangular plates. FIG. 8 is the connected integrated template consisting of different radius of parallel circular plates. The both halves have the same connecting rod 31 which are connected with 2 ends of the inside of said innermost templates in both halves C1, C2, and contain the central points. FIG. 9 is the connected integrated template consisting of different radii of parallel circular plates. The both halves have the different-shaped innermost plates containing the central points which can be drilled on the connecting rods 31 or the center of said innermost template 11. FIG. 10 is the connected integrated template consisting of different sizes of parallel hexagonal plates. The central points of both halves are positioned in different shapes of pieces, one is in the connecting rod 31, and another is in the center of the hexagonal innermost template 11. FIG. 11 is the connected integrated template consisting of different sizes of parallel triangular plates. The central points of the both halves are positioned in different shapes of pieces, one is in the connecting rod 11, and another is in the center of the hexagonal innermost template 11. FIG. 12 is the single integrated template consisting of different radius of parallel circular plates with the same central point. FIG. 13 is the single integrated template consisting of different sizes of parallel hexagonal plates with the same central point. FIG. 14 is the single integrated template consisting of different sizes of parallel triangular plates with the same central point.

Figure 15:
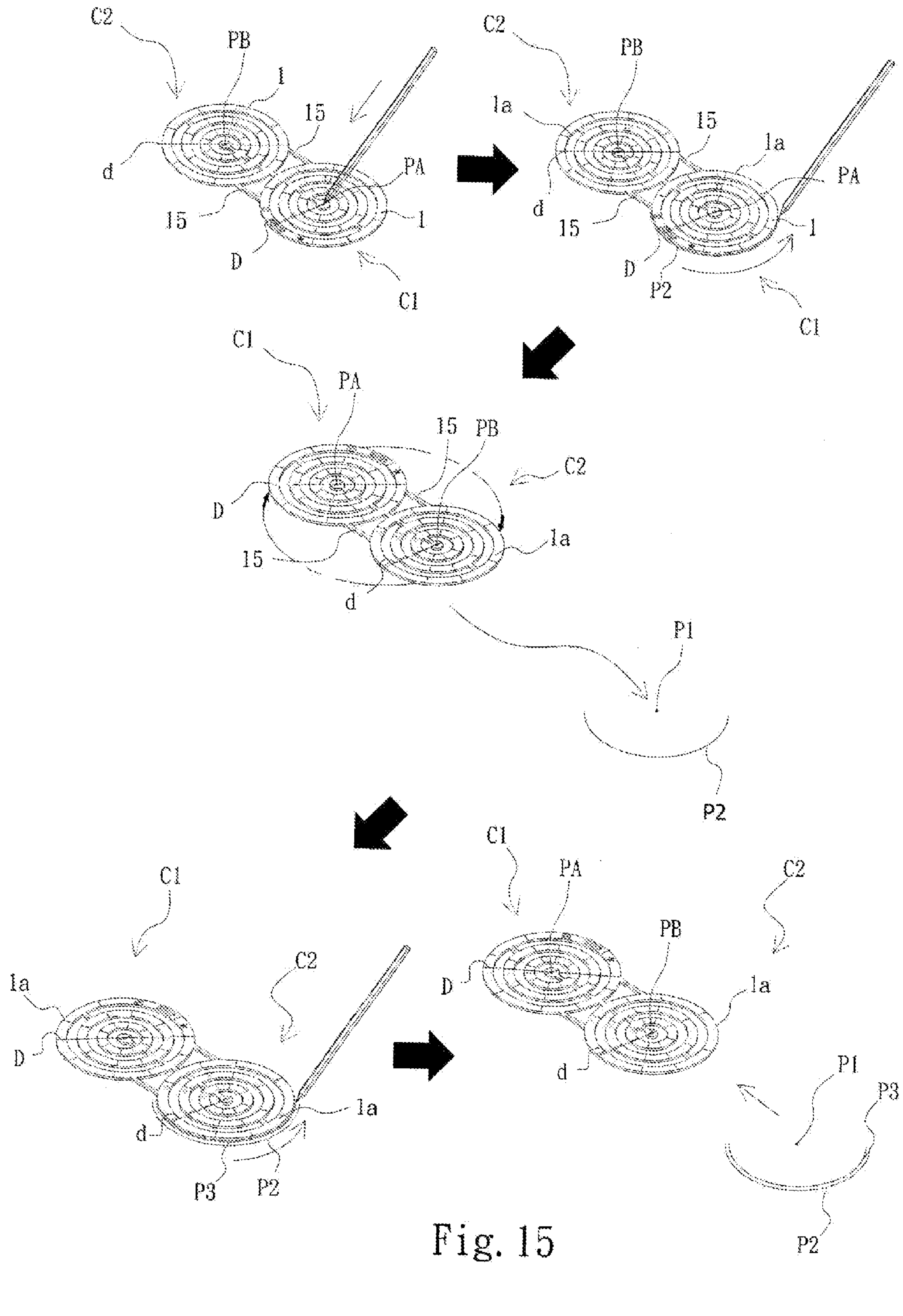
FIG. 15 illustrates one example of the practical operations of present invention.

FIG. 15 illustrates one example of the practical operations using the connected integrated template consisting of different radii of parallel circular plates with the same central point in the respective halves. This illustration describes how to draw both parallel curves focused on the same central point. First, use a pen to mark the central point P1 through the hole 10 (PA) of the half C1, and draw a curve P2 along the rim of an appropriate plate on cloth. Then, turn around the two halves C1 and C2 by 180 degrees in the horizontal direction, and aim the central point P1 with the hole 10 (PB) of the half C2. Finally, choose an appropriate plate to draw a parallel curve P3 along the inner side of the curve P2. The area between curves P2 and P3 is exactly intended for cloth stitching.

The description herein are only better embodiments of present invention, further modifications or changes depending on the scope or designation of present invention should be deeded to be infringement of claims hereafter.

I claim:

1. The integrated line and curve drawing templates for cloth stitching comprises:

two halves connected by connecting stick; there are two central points with two central holes, said holes of two halves each half having its own innermost plate, middle plates and outermost plate connected by connecting rods; the innermost, middle, and outermost plates of each half have the same central point; all plates of both halves are intended to be different from each other in the inner and outer diameters, but distances between each two templates in the same half is equal;

the connecting stick and connecting rod of both halves are connected and form a straight line which connect the center of both templates on both halves.

2. The integrated line and curve drawing templates for cloth stitching according to claim 1 is manufactured by the injection molded transparent polyvinyl chloride (PVC), polypropylene (PP), or acrylic in the compact and solid one-body format without any mechanical connection.

3. The integrated line and curve drawing templates for cloth stitching according to claim 1 wherein said inner and outer diameters of outermost plate is larger than the inner and outer diameters of middle plate, which is larger than the inner and outer diameters of innermost plate.

4. The integrated line and curve drawing templates for cloth stitching according to claim 1 wherein the shape of the outermost, middle and innermost plates are hollow-carved circles or polygons.

5. The integrated fine and curve drawing templates for cloth stitching according to claim 1 wherein each half or of the integrated templates has only a central point that is accurately positioned in the hole, which can be marked and aligned with the central points of other halves or modules.

6. The integrated line and curve drawing templates for cloth stitching according to claim 1 wherein said connecting stick is parallel to said connecting rod, and said connecting rods connect with both ends of said outmost templates of both halves.

7. The integrated line and curve drawing templates for cloth stitching comprises:

a central point which is positioned in a hole drilled in the center of the template;

an innermost plate, middle plates and outermost plate which are connected by connecting rod; the innermost, middle, and outermost plates have the same central point; all plates are intended to be different from each other in the inner and outer diameters, but distances between each two templates is equal;

a connecting stick which is a straight line and connect said outermost, middle and inner templates.

8. The integrated line and curve drawing templates for cloth stitching according to claim 7 is manufactured by the injection molded transparent polyvinyl chloride (PVC), polypropylene (PP), or acrylic in the compact and solid one-body format without any mechanical connection.

9. The integrated line and curve drawing templates for cloth stitching according to claim 7 wherein said hole which is drilled on the center of said connecting rod.

* * * * *